Jan. 30, 1945.   R. W. TIBBETTS   2,368,273
MANUFACTURE OF DOUBLE WALLED VESSELS
Filed Feb. 10, 1942
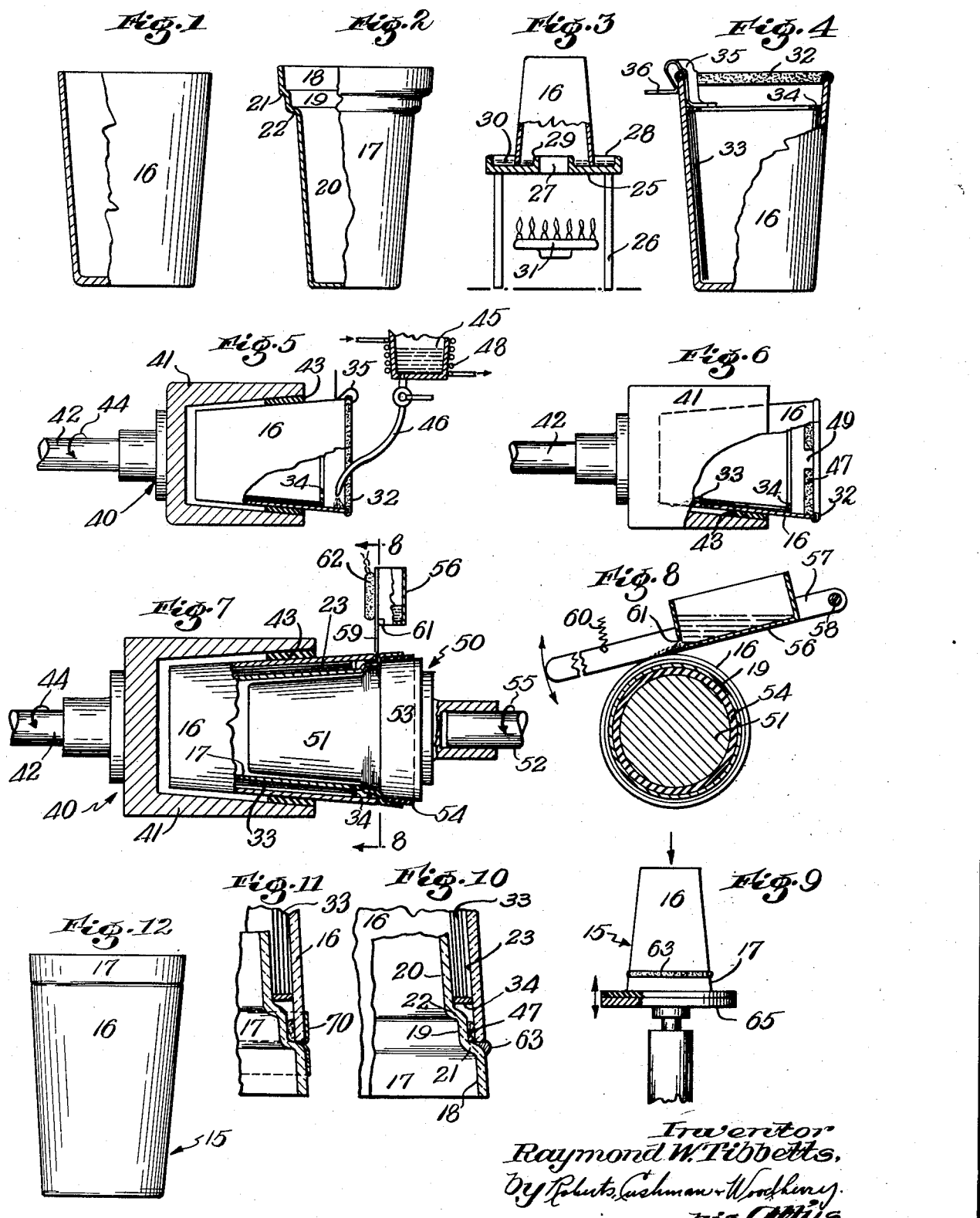

Patented Jan. 30, 1945

2,368,273

UNITED STATES PATENT OFFICE 2,368,273

MANUFACTURE OF DOUBLE WALLED VESSELS

Raymond W. Tibbetts, Camden, Maine, assignor, by mesne assignments, to Stator Corporation, a corporation of Delaware Application February 10, 1942, Serial No. 430,301

13 Claims. (Cl. 215—13)

This invention relates to the manufacture of double walled vessels, each comprising an inner container nested in an outer container with a ring of cement in the circumferential space between the containers near their upper ends, the sealed space between the two containers preferably containing layers of heat reflecting material or suitable insulation. Such vessels are useful for food and liquid containers, such as tumblers and cocktail shakers, and also for ice pails, teapots, butter dishes, etc.

Objects of the invention are to provide a method of making such vessels which is simple and efficient in operation, which provides an effective seal between the two containers and which may utilize any liquid or semiplastic cement which is best suited to the material of which the containers are formed and the uses to which the resulting vessel is to be put. Other objects are to provide apparatus for carrying out the method which is simple and economical to construct, which is durable and reliable in use and which uniformly produces a satisfactory product.

In one aspect the present invention involves a method of making a double walled vessel comprising an inner container nested in an outer container with a cement seal between opposed circumferential zones of the two containers, characterized by rotating the two containers in co-axial alignment with the bottom of the inner container facing the mouth of the outer container and, while the containers are rotating, depositing a ring of cement on one of the aforesaid zones and then telescoping the containers together until the ring of cement contacts the other of the aforesaid zones. By applying a bead of beeswax or the like just above the ring of cement, the tendency for the cement to squeeze out from between the two containers when they are telescoped together is counteracted. The bead of wax also counteracts any tendency toward displacement of the cement before it has set due to contraction or expansion of the air trapped between the two containers. It also serves to hold the two containers in proper position in relation to each other while the cement is setting. The wax is soluble in water or can be melted by heat supplied by hot water or other inexpensive solvent so that it may be readily removed after the cement has set. In order to permit the air to flow out from between the two containers while they are being telescoped together, without displacing the ring of cement, the ring may be interrupted to afford a short gap for the air current or a continuous ring may be applied far enough inside the edge of the outer container so as not completely to bridge the annular space between the two containers after they are telescoped together. After the containers have been telescoped together the gap or space may be readily closed by vibrating the two containers to cause the cement to flow into the gap or space. By vibrating the containers while they are in inverted position the cement is also caused to settle in a compact ring against the aforesaid bead of wax. Whether or not the aforesaid bead of wax is applied, the crack between the two containers after they are telescoped together is preferably sealed with a band of wax immediately after they are telescoped together and before they are vibrated. If it is desired to avoid the use of the wax band a strip of adhesive tape may be applied to the tumbler over the said gap while the glasses are rotating to seal the gap, to prevent the cement from escaping and to hold the glasses firmly in fixed relationship while they are being vibrated.

In another aspect the invention involves apparatus comprising opposed mandrels for rotating the two containers in coaxial alignment with the bottom of the inner container facing the mouth of the outer container, together with means for producing relative movement of the mandrels toward each other while they are rotating to telescope the containers together. Preferably one mandrel is shaped frictionally to engage the inside of one container and the other mandrel is shaped frictionally to engage over the outer surface of the outer container, so that the containers may be quickly applied to the mandrels and are self-aligning when so applied.

The apparatus may also comprise a spring clip fitting over the edge of the container to which the ring of cement is first applied, the ring being interrupted to form the aforesaid gap by removing the clip before the containers are telescoped together. One of the mandrels preferably has a slip connection so that the two containers may rotate in unison after they are telescoped together notwithstanding any tendency for the apparatus to rotate one container faster than the other. Preferably the apparatus comprises means for applying the aforesaid ring of cement and the wax seal while the containers are still rotating on the mandrels.

For the purpose of illustration a typical embodiment of the invention is shown in the accompanying drawing in which Figs. 1 and 2 are views in side elevation of the outer and inner containers before they are nested together;

Fig. 3 illustrates the step of forming a bead of wax or the like at the upper edge of the outer container;

Fig. 4 is a view in side elevation, with parts broken away, of the outer container provided with such a bead, a clip over the upper edge of the container, and insulating material held in position by said clip;

Fig. 5 illustrates the step of applying a ring of cement or other adhesive to the inner face of the outer container, such container being supported in a rotatably mounted holder;

Fig. 6 is a view partly in section of the outer container in its holder after the step shown in Fig. 5 has been performed and the clip subsequently removed;

Fig. 7 shows in cross section the two containers in nested relation, each container being supported by a rotatable holder and a band of wax being supplied to seal the crack between the containers;

Fig. 8 is a section on line 8—8 of Fig. 7, showing the wax applying device in the operative position;

Fig. 9 shows the step of subjecting the nested containers in inverted position to a vertically set up vibratory movement whereby the cement is distributed uniformly and caused to settle in contact with both containers;

Fig. 10 is a view in enlarged cross section illustrating the relation of the containers after the step shown in Fig. 9;

Fig. 11 is a view similar to Fig. 10 of the containers when joined by a strip of tape instead of by a wax band; and Fig. 12 is a view in side elevation of a completed tumbler.

The tumbler or drinking glass 15 comprises an outer container 16 and an inner container 17. As shown in the drawing the wall of the outer container 16 has the tapered shape typical of a tumbler but the wall of the inner container is formed in three integral portions 18, 19 and 20 of different diameters and having substantially the same flare as the wall of the outer container. When the containers are nested the upper portion 18 forms a continuation of the wall of the outer container (see Figs. 10 and 11) and is hereinafter referred to as the lip of the tumbler. The intermediate portion 19 is spaced from the upper portion 18 by a shoulder 21 and has an outer diameter somewhat less than the inner diameter of the adjacent portion of the outer container. The lower portion 20 is separated from the intermediate portion 19 by a shoulder 22 and has a diameter still less than the diameter of the adjacent portion of the outer container so that it defines therewith an annular space 23. When the containers are nested to form the tumbler 15 the shoulder 21 rests on the upper edge of the outer container and the bottom walls of the containers are out of contact with each other.

Various steps are progressively performed in assembling the containers into a tumbler. The outer face of the portion 19 of the inner container 17 and the inner face of the outer container adjacent the mouth are preferably cleaned with either acid or alkali cleaning solutions or with water glass or with cement to prepare them for the reception of cement. Thereafter are performed the steps which have been illustrated in Figs. 3 to 9 inclusive.

First a bead of wax or other material of similar structure and consistency is formed on the upper edge of the outer container by suitable means, as for example the apparatus shown in Fig. 3. Such apparatus consists of a ring 25 supported on legs 26, the peripheries of the ring 25 being bounded by upstanding flanges 28 and 29 respectively, so that the upper surface of the ring forms an annular receptacle 30 adapted to hold a pool of melted beeswax or the like. The ring 25 is of metal and is heated, as by a gas burner 31, to keep the wax in the fluid state. The container is inverted over the central opening 27, with its upper edge in the receptacle 30 below the level of the wax, to coat the edge. The opening 27 prevents trapping of air so that the wax bath is not agitated by escaping air as the edge of the container is dipped in the pool; and the heated air rising through the opening warms the container slightly so that it does not pick up an excess of wax as would be the case if it were cold or chilled.

After the container has been removed from the receptacle 30 and the wax bead has set thereon, insulation 33 is slipped into the container. As shown in Fig. 4 such insulation may comprise a coil or bands of foil paper or the like, the upper end of which is covered by a ring 34. If the ring be of paper it may be treated with a cellulose acetate. A clip 35 is snapped over the outer edge of the container. The insulating coil or bands and the ring are of such dimension that the clip 35, bearing on the ring 34, holds the insulation in position with the lower edge of the coil or bands against the bottom wall of the container. The clip 35 is of spring metal or plastic and is preferably so formed that it is looped away from the upper edge of the container, bears against the outer wall thereof below the bead 33 and terminates in an outwardly extending tab 36.

The outer container 16 is now inserted in a holder 40 which comprises a cup 41 mounted on a shaft 42. The holder is supported and rotated by means not shown. A band 43 of rubber or other resilient means holds the container properly centered in the holder. The arrow 44 indicates the direction of rotation of the holder and container. A line of cement or other adhesive is now applied on the inner face of the outer container. Any setting cement may be used but it should have the following characteristics: good adhesion to the containers; approximately the same coefficient of expansion as the material of the containers; substantially no shrinkage or expansion on setting; resistant to water and preferably also to alcohol; and nonporous. In the drawing the cement is fed from a reservoir 45 through a flexible valve controlled tube 46 and laid in a band 47 upon the inner wall of the container. If the band is applied close enough to the edge of the container to flow over the edge, the aforesaid bead of wax prevents the overflow. The cement in the reservoir 45 is kept fluid and prevented from setting too rapidly by being kept cold as by a refrigerating coil 48. One or more rotations of the holder will insure a band 47 of the desired thickness. The clip 35 over the edge of the container is now removed, and the removal of that portion of the cement band 47 which was passed over the clip will leave a gap 49 (Fig. 6). The form of the clip is such that pressure on the tab 36 applied toward the bottom of the container will cause the clip to swing about the line of engagement of the tab and container wall as a fulcrum and to snap off the container without disturbing the remainder of the cement band 47.

The inner container 17 is mounted on another holder 50 comprising a mandrel 51 carried by a rotatable shaft 52. The mandrel 51 includes an annular head 53 which bears against the inner face of the shoulder 21 and is provided with a band 54 of rubber or other resilient material which bears against the inner face of the lip portion 18. Thus the inner container is centered on the holder 50. The rotating inner container 17 is then inserted into the outer container, also rotating, until the shoulder 21 is seated firmly against the edge of the outer container, the wax bead 32 making a substantially tight seal between said shoulder and said edge along the line of contact.

The gap 49 in the band of cement allows any excess air trapped between the containers to escape as they are nested. The nesting of the containers takes place while both holders 40 and 50 are rotated in the direction indicated by the arrows 44 and 55. While it is intended that both holders should travel at the same speed one holder preferably includes a slip connection to avoid positive rotation of the containers at different rates and the consequent movement of one container relative to the other. As shown in Fig. 7 the mandrel 51 is so mounted on the shaft 52. During the rotation of the nested containers a band of wax 63 is applied over the line of joinder of the containers. A reservoir 56 of wax is supported on a frame 57 pivoted at its rear end on a stud 58 and having a handle 59 by which the frame is tilted down from the position in which it is normally held by a spring 60 or other suitable means. When handle 59 is brought into contact with the revolving containers the liquid flows in a stream from the reservoir 56 through an orifice 61 along the edge of the handle over the abutting surfaces of the containers. Heating means such as the electric heater 62 are provided to keep the wax in the fluid state. The wax from the reservoir 56 thus forms a band 63 which covers the crack between the containers and holds the containers in the telescoped position.

The tumbler 15 formed by the nested containers is removed from the holders 40, 50 and placed in the inverted position upon a vertically vibrated table 65. This vibration, and particularly its upward component, causes the cement to fill the gap 49 and settle firmly into contact with both containers in the space between the outer face of the portion 19 of the inner container and the inner face of the outer container so that the containers are joined and the space 23 containing the insulation 33 is completely sealed. After the cement has set sufficiently to hold the containers in fixed position relatively to each other the wax band 63 at the line of joinder is removed by hot water or other means.

Fig. 11 illustrates the substitution for the wax band 63 of an adhesive strip of tape 70 of pressure-sensitive painter's tape or any suitable material by which the crack between the containers is covered and the containers held in the nested position. Preferably a portion of the tape is forced into the mouth of the crack by means of any suitable tool (not shown).

While the invention has been described and shown as employed in the manufacture of a double walled tumbler, it will be understood that it is not limited thereto and may be employed in other ways without departing from the spirit and scope of the invention, as set forth in the accompanying claims.

I claim:

1. For making a double walled vessel comprising an inner container nested in an outer container with a cement seal between the two containers, the method which comprises coating the edge of the outer container with wax, depositing a ring of cement inside the waxed edge, and telescoping the containers together until the ring of cement and waxed edge contact the other container, the wax preventing the escape of the cement as the cement is compressed between the two containers.

2. For making a double walled vessel comprising an inner container nested in an outer container with a cement seal between the two containers, the method which comprises coating the edge of the outer container with wax, depositing a ring of cement inside the waxed edge, telescoping the containers together until the ring of cement and waxed edge contact the other container, the wax preventing the escape of the cement as the cement is compressed between the two containers, and after the cement has set washing said wax away.

3. For making a double walled vessel comprising an inner container nested in an outer container with a cement seal between opposed circumferential zones of the two containers, the method which comprises depositing a ring of cement on one of said zones with a gap in the ring to permit the escape of air when the containers are nested together, telescoping the containers together until the ring of cement contacts the other of said zones, and then vibrating the containers to close said gap.

4. The method of making a double walled vessel consisting of an inner container nested in an outer container, which method comprises the steps of applying a band of plastic cement to one face of one of the containers, nesting said containers and while the cement is in plastic condition vibrating said nested containers to cause the cement to settle into contact with both containers and seal the space therebetween.

5. The method of making a double walled vessel consisting of an inner container nested in an outer container, which method comprises the steps of applying a band of plastic cement to one face of one of the containers, nesting said containers, applying wax to the outer face of the vessel to cover the line of joinder of the containers, while the cement is in plastic condition vibrating said nested containers to cause the cement to settle into contact with both containers and seal the space therebetween and removing the wax from the outer face of the vessel.

6. The method of making a double walled vessel consisting of an inner container nested in an outer container, which method comprises the steps of applying a non-continuous band of cement to the inner face of the outer container, nesting said container, and vibrating said nested containers to cause the cement to settle into contact with both containers and completely seal the space therebetween.

7. The method of making a double walled vessel consisting of an inner container nested in an outer container, which method comprises the steps of applying a non-continuous band of cement to one face of one of the containers, nesting said containers, applying wax to the outer face of the vessel to cover the line of joinder of the containers, vibrating said nested containers to cause the cement to settle into contact with both containers and completely seal the space between the containers and removing the wax from the outer face of the vessel.

8. The method of making a double walled vessel consisting of an inner container nested in an outer container, which method comprises the steps of forming a wax bead at the outer edge of the outer container, applying a band of cement to the inner face of the outer container adjacent said wax bead, nesting said containers, and vibrating the nesting containers to cause the cement to settle into contact with both containers and seal the space therebetween.

9. The method of making a double walled vessel consisting of an inner container nested in an outer container, which method comprises the steps of forming a wax bead at the outer edge of the outer container, applying a band of cement to the inner face of the outer container adjacent said wax bead, nesting said containers, applying wax to the outer face of the vessel to cover the line of joinder of the containers, causing the cement to settle into contact with both containers and completely seal the space between the containers, and removing the wax from the outer face of the vessel.

10. The method of making a double walled vessel consisting of an inner container nested in an outer container, which method comprises the steps of forming a wax bead at the outer edge of the outer container, applying a non-continuous band of cement to the inner face of the outer container adjacent said wax bead, nesting said containers, and causing the cement to settle into contact with both containers and completely seal the space therebetween.

11. The method of making a double walled vessel consisting of an inner container nested in an outer container with a cement seal between opposed faces of the containers, which method comprises the steps of applying cement to one of said faces, nesting said containers, applying removable means to the outer face of the vessel over the line of joinder of the containers, vibrating said nested containers to cause the cement to settle into contact with both containers and completely seal the space between the containers, and removing said means from the outer face of the vessel.

12. The method of making a double walled vessel consisting of an inner container nested in an outer container with a cement seal between opposed faces of the containers, which method comprises the steps of applying cement to one of said faces, nesting said containers, applying a strip of adhesive tape to the outer face of the vessel over the crack formed by the joinder of the containers, vibrating said nested containers to cause the cement to settle into contact with both containers and completely seal the space therebetween and removing said tape from the outer face of the vessel.

13. The method of making a double walled vessel consisting of an inner container nested in an outer container with a cement seal between opposed faces of the containers, which method comprises the steps of applying cement to one of said faces, nesting said containers, applying a strip of adhesive tape to the outer face of the vessel over the crack formed by the joinder of the containers, forcing a portion of the tape into the mouth of the crack, vibrating said nested containers to cause the cement to settle into the crack and completely seal the space therebetween and removing said tape from the outer face of the vessel.

RAYMOND W. TIBBETTS.